United States Patent [19]

Kimizuka et al.

[11] Patent Number: 4,484,242
[45] Date of Patent: Nov. 20, 1984

[54] TAPE GUIDE FOR TENSIONING TAPE AND REGULATING THE RUNNING THEREOF IN A SMALL OR MINI-CASSETTE

[75] Inventors: Masanori Kimizuka; Nobuyuki Idei, both of Tokyo, Japan

[73] Assignee: Sony Corporation, Tokyo, Japan

[21] Appl. No.: 366,249

[22] Filed: Apr. 6, 1982

[30] Foreign Application Priority Data

Apr. 11, 1981 [JP] Japan .............................. 56-52548[U]

[51] Int. Cl.³ ........................ G11B 15/60; G11B 23/02
[52] U.S. Cl. .......................... 360/130.21; 360/130.31; 360/132
[58] Field of Search .............. 360/132, 130.31, 130.32, 360/130.33, 130.21; 242/199

[56] References Cited

U.S. PATENT DOCUMENTS

| | | | |
|---|---|---|---|
| 3,529,788 | 9/1970 | Sasaki et al. | 242/199 |
| 4,041,537 | 8/1977 | Kishi | 360/132 X |
| 4,053,121 | 10/1977 | Unfried | 242/199 |
| 4,152,735 | 5/1979 | Schoenmakers | 360/71 |

*Primary Examiner*—John H. Wolff
*Attorney, Agent, or Firm*—Lewis H. Eslinger; Alvin Sinderbrand

[57] ABSTRACT

A small or mini-cassette having a body containing rotatable laterally spaced reel hubs with a magnetic tape wound thereon, and guide elements permanently in the cassette body and leading the tape between the hubs in a run extending along the inside of a peripheral wall at the front of the body, is provided with a plurality of windows spaced apart along the peripheral wall for exposing the tape run therebehind, laterally spaced apart pairs of aligned openings extending through the upper and lower body walls in back of the tape run at locations registering with respective ones of the window, and a pair of aligned apertures extending through the upper and lower walls between the pairs of openings; and a tape recorder for such cassette includes at least one capstan projecting into a selected one of the pairs of aligned openings, a pinch roller associated with each capstan and insertable rearwardly through the window registered with the selected pair of openings for engaging the tape therebehind with the capstan, a magnetic head insertable rearwardly in another of the windows for recording or reproducing signals on the tape being driven by the capstan and pinch roller, and a tape guide post or posts extending into the apertures from outside of the cassette body and engaging the tape run adjacent the magnetic head for stabilizing the movement of the tape when being driven past such head by the capstan and pinch roller.

12 Claims, 10 Drawing Figures

TAPE GUIDE FOR TENSIONING TAPE AND REGULATING THE RUNNING THEREOF IN A SMALL OR MINI-CASSETTE

BACKGROUND OF THE INVENTION

1. Field of the Invention

This invention relates generally to a tape cassette which is particularly suited to be made smaller in size than the standard compact tape cassette, and also is directed to a tape recorder for use with such relatively smaller tape cassette.

2. Description of the Prior Art

Heretofore, a tape cassette which is smaller in size than the standard compact tape cassette has been used to permit miniaturization of the corresponding cassette-type tape recorder. When such relatively smaller tape cassette is loaded or positioned in the tape recorder intended therefor, a run of the magnetic tape within the cassette body is grasped between a capstan and pinch roller of the tape recorder so as to be driven at a constant speed thereby in a recording or reproducing operation, and a magnetic head is introduced into the cassette body through a window at the front thereof for engagement with the magnetic tape run therebehind so as to record or reproduce signals thereon. By reason of such engagement of the magnetic head with the tape run, the latter is brought into frictional contact with a guide pole which is integral with the cassette body inside the latter at a position in advance of the magnetic head, considered in the direction of the movement of the tape run. By thus bringing the tape into frictional contact with the guide pole, the running magnetic tape is provided with a suitable back tension and the tape run engaged by the magnetic head is stabilized and maintained in a substantially fixed position in respect to the head.

Since the guide pole for stabilizing the tape run is formed integrally with the cassette body molded of a synthetic resin, if the cassette body is deformed or distorted, the guide pole may also be distorted so that it is difficult to ensure precise uniformity of the configuration and position of the guide pole in various interchangeable tape cassettes. Particularly, it is difficult to maintain true circularity of the guide pole and its precise perpendicularity relative to the upper and lower walls of the cassette body. As a result, with the prior art tape cassette, it is difficult to ensure stability of the tape run engaged by the magnetic head during recording and reproducing, whereby satisfactory recording and reproducing characteristics may not be attained.

OBJECTS AND SUMMARY OF THE INVENTION

Accordingly, it is an object of this invention to provide a tape cassette, which may be made in a size smaller than that of the standard compact tape cassette, and which avoids the previously mentioned problems of the prior art.

More specifically, it is an object of this invention to provide a tape cassette of relatively smaller size, as aforesaid, and in which a tape run within the cassette body engaged by a magnetic head during recording or reproducing of signals thereon is reliably stabilized for affording improved recording and reproducing characteristics.

Another object of the invention is to provide a tape cassette, as aforesaid, having a cassette body into which a guide pole or poles can extend from the exterior thereof when the cassette is in use in a respective tape recorder for very precisely positioning and stabilizing a tape run in the cassette body relative to a magnetic head which also extends into the cassette body from the tape recorder for recording or reproducing signals on such tape run.

A further object of the invention is to provide a tape cassette, as aforesaid, which may be made smaller in size than the standard compact tape cassette, and which has improved recording and reproducing characteristics even when the recorded signal, such as a musical tone, extends over a very wide frequency band.

Still another object is to provide a tape cassette, as aforesaid, capable of use for recording and reproducing in various types of tape recorders.

A still further object of the invention is to provide a cassette-type tape recorder for use with a tape cassette, as aforesaid.

In accordance with an aspect of this invention, in a tape cassette comprising a cassette body having upper and lower substantially rectangular walls and a peripheral wall therebetween at the front, back and opposite sides of the cassette body, a pair of laterally spaced apart reel hubs rotatable within the cassette body and having a magnetic tape wound thereon, and guide elements permanently located in the cassette body and leading the tape between the reel hubs in a run extending along the inside of the peripheral wall at the front of the cassette body; a plurality of windows are spaced apart along the peripheral wall at the front of the cassette body for exposing the tape run therebehind, pairs of aligned openings extend through the upper and lower walls at laterally spaced apart locations in back of the tape run and register with respective ones of the windows so that, when the tape cassette is in use in a tape recorder, each or either of the pairs of openings can receive a capstan against which the tape run is engaged by a pinch roller inserted rearwardly through the respective one of the windows, and aligned apertures are extended through the upper and lower walls of the cassette body in back of the tape run between the pairs of openings so that, in the use of the tape cassette in a respective tape recorder, such aligned apertures are adapted to receive tape guide means, such as, one or more guide posts or poles, extended into the cassette body from a chassis or other portion of the tape recorder at the outside of the cassette body. Such guide post or posts, being a part of the tape recorder, can be very precisely shaped and positioned relative to other elements of the tape recorder, such as, the recording and/or reproducing head thereof. Thus, when the tape cassette embodying the invention is positioned in the respective tape recorder, the insertion of the magnetic recording and/or reproducing head of the latter into a respective window of the cassette body can move the tape run within the cassette body into frictional contact with the precisely shaped and positioned guide post or posts to provide the requisite back tension for the tape and to ensure stabilization of the tape run engaged by the head and the reliable positioning of the tape run relative to the head.

The above, and other objects, features and advantages of this invention, will be apparent in the following detailed description of illustrative embodiments thereof which is to be read in connection with the accompanying drawings in which like parts and components in the several views are identified by the same reference numerals.

DESCRIPTION OF THE PREFERRED EMBODIMENTS

Figure 1:
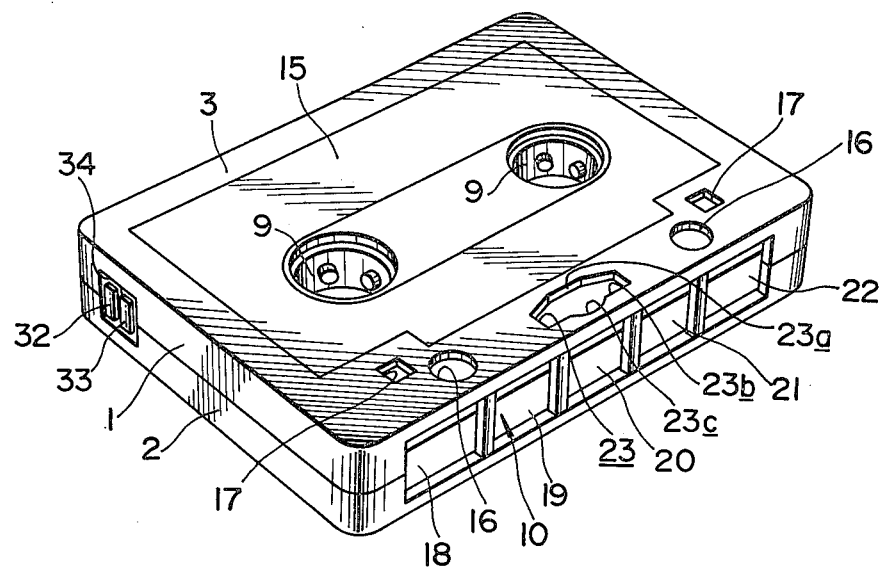
FIG. 1 is a perspective view of a tape cassette according to an embodiment of the present invention.

Referring initially to FIG. 1, it will be seen that a tape cassette according to an embodiment of this invention generally comprises upper and lower halves 1 and 2 of a cassette body 3 which may, for example, be molded of a suitable synthetic resin. The upper and lower halves 1 and 2 define substantially rectangular upper and lower walls, respectively, and have marginal flanges which are secured to each other in abutting relation to form cassette body 3, for example, by screws or pins 4 (FIG. 4) extended through bored bosses 5 molded as portions of the halves 1 and 2. The marginal flanges of body halves 1 and 2, when thus secured together, define a peripheral wall having portions extending between the rectangular upper and lower walls at the front (FIG. 5), back (FIG. 6), and opposite sides (FIGS. 1 and 4) of the cassette body.

Figure 2:
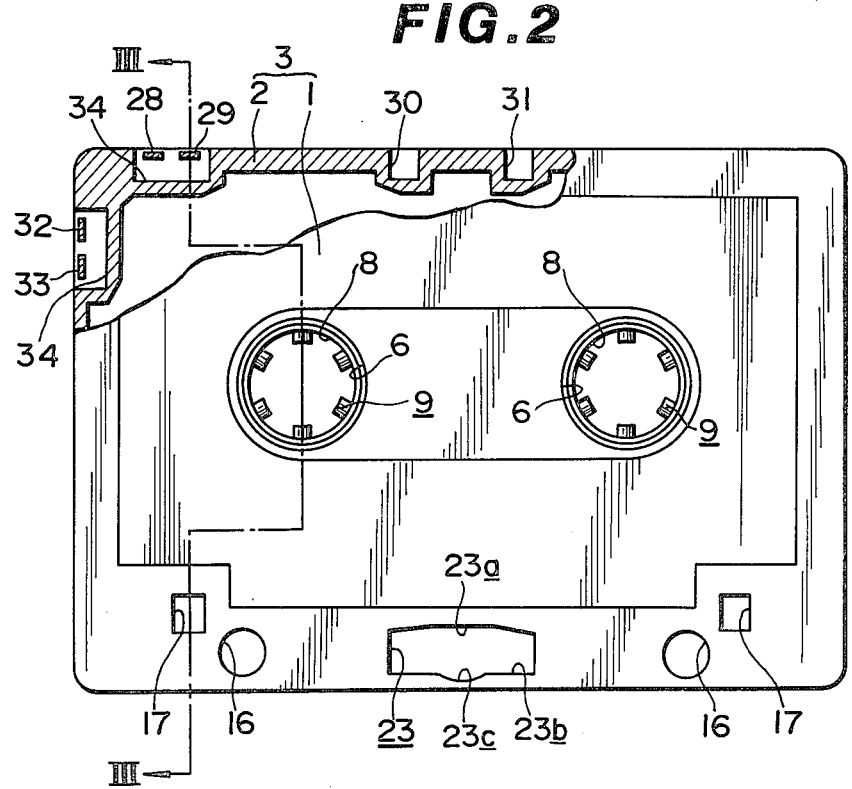
FIG. 2 is a plan view, partly broken away and in section, showing the tape cassette of FIG. 1.
Figure 3:
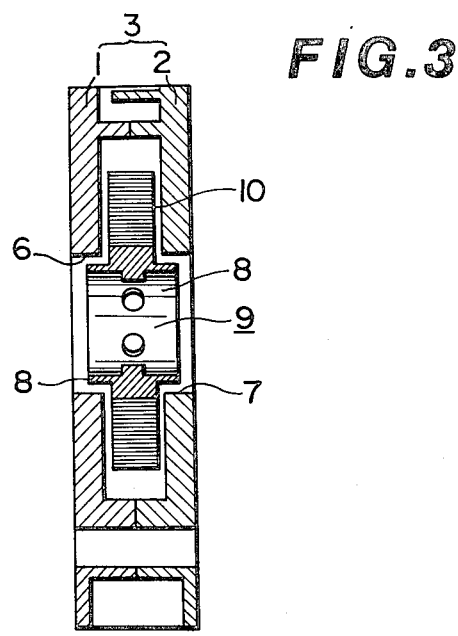
FIG. 3 is a sectional view of the tape cassette taken along the line III—III on FIG. 2.

As shown on FIG. 2, a pair of laterally spaced apart circular holes 6 are formed in the upper wall of cassette body 3, and a similar circular hole 7 is formed in the lower wall of cassette body 3 (FIG. 3) so as to be aligned with each of the holes 6. A pair of laterally spaced apart reel hubs 9 are disposed within cassette body and have annular, axially extending projections 8 which are loosely received in the circular holes 6 and 7 for rotatably guiding the reel hubs within cassette body 3. As shown on FIG. 3, a predetermined quantity of magnetic tape 10 is wound on reel hubs 9, and guide elements permanently located in cassette body 3 lead tape 10 between reel hubs 9 in a run 10a (FIG. 4) extending along the inside of the portion of the peripheral wall of cassette body 3 which is at the front of the latter. More particularly, the tape 10 between reel hubs 9 is passed around guide pins 11 and 12 which extend fixedly from the lower wall of cassette body 3 adjacent the opposite side portions of the latter, and also around guide rollers 13 and 14 which are rotatably mounted within cassette body 3 at the corners of the latter where the front of the cassette body joins the opposite ends or sides thereof. As shown on FIG. 1, the upper and lower surfaces of cassette body 3 may be provided with labels 15 adhered thereto and on which suitable information or indicia may be printed or otherwise displayed.

Figure 4:
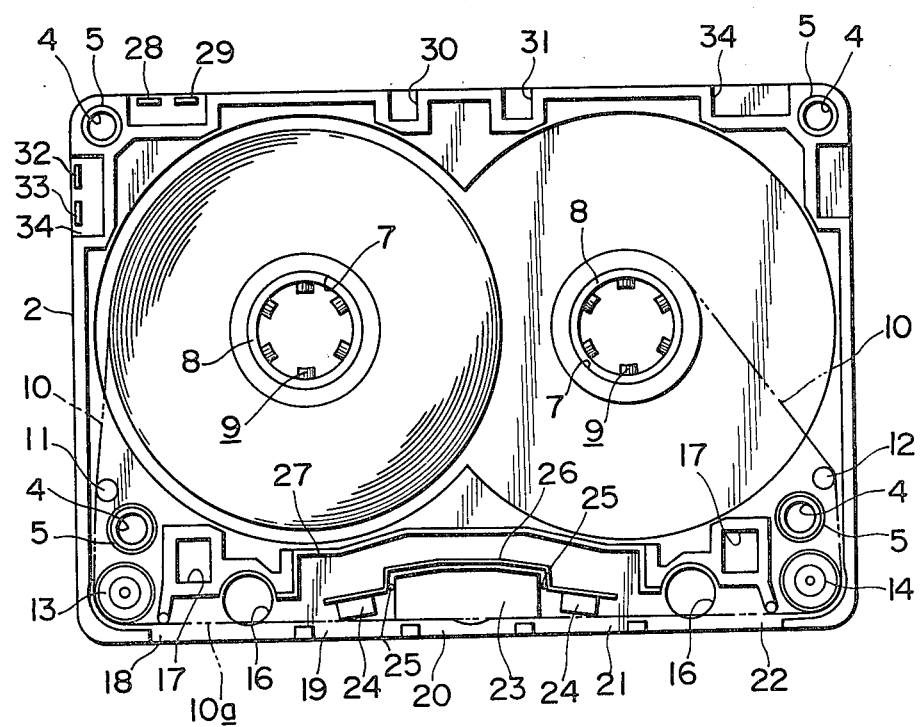
FIG. 4 is a plan view of the tape cassette of FIGS. 1-3, but with an upper half of its cassette body removed to better show the internal construction of the cassette.

The upper and lower walls of cassette body 3 of a tape cassette according to this invention are formed with pairs of aligned circular capstan insertion openings 16 extending therethrough at laterally spaced apart locations in back of tape run 10a (FIGS. 2 and 4). Further, cassette body 3 has positioning holes 17 extending therethrough adjacent capstan insertion openings 16 for receiving positioning pins, as hereinafter described, when the tape cassette is loaded in a tape recorder suitable therefor.

Figure 5:
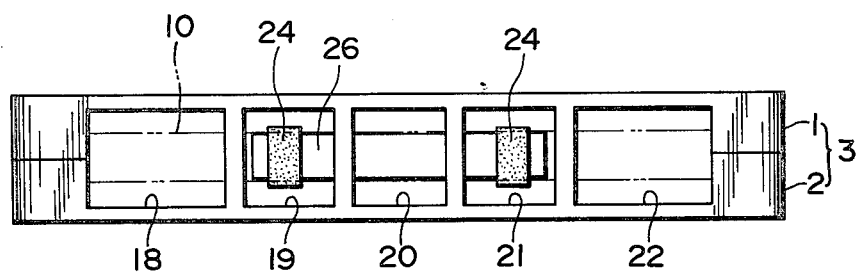
FIG. 5 is a front elevational view of the tape cassette of FIGS. 1-4.

As shown on FIGS. 1, 4 and 5, the portion of the peripheral wall of cassette body 3 at the front of the latter is formed with five windows 18, 19, 20, 21 and 22 spaced apart therealong for exposing the tape run 10a through such windows. The capstan insertion openings 16 are laterally located so as to substantially register with the first and last windows 18 and 22, respectively so that, when a capstan is inserted in either of the pairs of openings 16, as hereinafter described, a corresponding pinch roller can be inserted rearwardly through the respective window 18 or 22 for pressing the tape in run 10a against the capstan.

In accordance with this invention, the upper and lower walls of cassette body 3 are further provided, adjacent to the front of the cassette body, with centrally located, approximately rectangular apertures 23 which are aligned with each other and which are laterally elongated so as to be substantially coextensive with the central window 20. The approximately rectangular apertures 23 extend rearwardly from tape run 10a (FIG. 4), and the longitudinal edge 23a of each of the apertures 23 which is remote from the tape run 10a is concave, that is, its opposite end portions are skewed rearwardly so that the depth of each of the apertures 23, at the middle thereof, is greater than the corresponding dimensions of the aperture 23 at the opposite ends of the latter. Further, the forward edge 23b of each aperture 23, that is, the edge extending along tape run 10a, has an arcuate recess 23c at its central portion for a purpose hereinafter described in detail.

As shown on FIG. 4, pads 24 are provided in cassette body 3 in back of the windows 19 and 21 which are at opposite sides of central window 20. Such pads 24 are adhesively or otherwise attached to the opposite end portions of a resilient shield plate or strip 26 which is mounted on support pins 25 inside cassette body 3. A partition 27 for protecting the magnetic tape 10 wound on reel hubs 9 extends from one pair of the openings 16 to the other pair of such openings between the upper and lower walls of cassette body 3.

Figure 6:
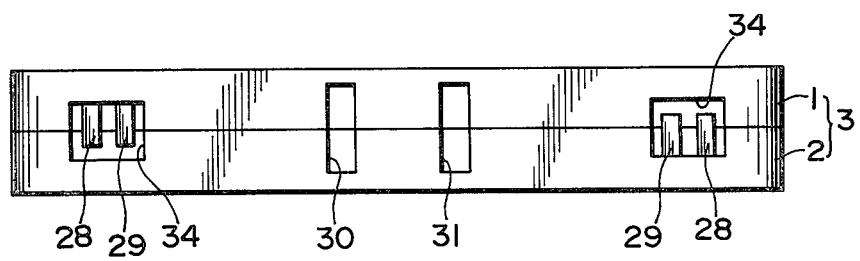
FIG. 6 is a back elevational view of the tape cassette of FIGS. 1-4.

As shown on FIG. 6, the peripheral wall of cassette body 3, at the back of the latter, is provided with removable pawls 28 for preventing erroneous erasing of signals recorded on the respective tape 10, pawls 29 for indicating the tape speed with which signals have been recorded on tape 10, and suitably located recesses 30 and 31 for identifying the kind of magnetic tape accommodated in cassette body 3. Further, as shown in FIG. 2, at one side of cassette body 3, the peripheral wall thereof is provided with a noise reduction selection pawl 32 and a spare pawl 33 for controlling or indicating any other function of a tape recorder with which the tape cassette may be used. The various pawls 28, 29, 32 and 33 are shown to be formed integrally with the upper or lower halves 1 and 2 of body 3 and, when such halves 1 and 2 are assembled together, the pawls formed on each half of the body are received or located in corresponding recesses 34 formed in the other half of the body.

Figure 7:
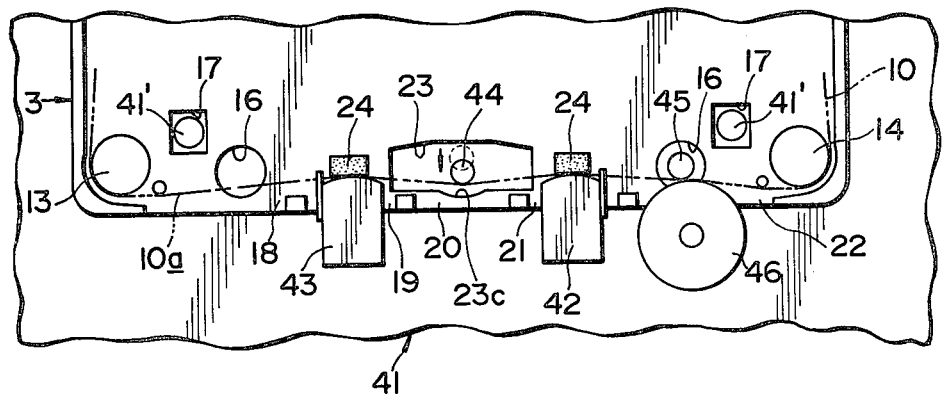
FIG. 7 is a fragmentary schematic plan view showing the essential elements of a cassette-type tape recorder according to one embodiment of this invention for use with tape cassette of FIGS. 1-4.

Referring now to FIG. 7, it will be seen that, a cassette-type tape recorder according to one embodiment of this invention for use with the tape cassette described above with reference to FIGS. 1-6 essentially includes a chassis 41 from which positioning pins 41' extend for reception in holes 17 so as to accurately locate cassette body 3 of the tape cassette relative to the tape recorder. When cassette body 3 is thus located, a capstan 45 rotatable by a motor (not shown) and projecting from chassis 41 is received in one of the pairs of openings 16 so as to be disposed in back of that portion of tape run 10a exposed at the respective window, for example, the window 22. A rotatable pinch roller is suitably mounted on chassis 41 for movement toward and away from capstan 45. Thus, after cassette body 3 has been located by positioning pins 41' on chassis 41, pinch roller 46 can be inserted rearwardly through window 22 for pressing tape run 10a against capstan 45. With tape run 10a thus grasped or clamped between rotated capstan 45 and pinch roller 46, the tape is advanced or driven at a constant speed, for example, in the direction from left to right in run 10a as viewed on FIG. 7.

The tape recorder shown on FIG. 7 further includes a recording and/or reproducing magnetic head 42 and an erasing head 43 which are suitably mounted on a head support or carriage (not shown) so that such heads 42 and 43 may be inserted rearwardly into windows 21 and 19, respectively, of the cassette body 3 located on chassis 41. When heads 42 and 43 are inserted into the respective windows 21 and 19, respectively, the heads rearwardly deflect tape run 10a from its normal course and bring the tape into contact with the respective pads 24.

In accordance with this invention, the tape recorder shown on FIG. 7 is provided with a guide post 44 extending from chassis 41 so as to be received substantially centrally in apertures 23 of the upper and lower walls of cassette body 3 when the latter is located on the chassis. When cassette body 3 is initially positioned or located on chassis 41, guide post 44 received in apertures 23 is desirably spaced rearwardly from tape run 10a which is then disposed immediately inside the portion of the peripheral wall of body 3 at the front of the latter, for example, as shown on FIG. 4. Thereafter, when heads 42 and 43 are inserted rearwardly in windows 21 and 19 for initiating a recording or reproducing operation of the tape recorder, as on FIG. 7, the resulting rearward deflection of tape run 10a against pads 24 causes tape run 10a intermediate pads 24 to be frictionally contacted with guide post 44 which extends forwardly in respect to pads 24. Thus, when pinch roller 46 is inserted rearwardly in window 22 for grasping the tape between rotated capstan 45 and the pinch roller and thereby driving tape run 10a from left to right, as viewed on FIG. 7, the frictional contact of the tape with guide post 44 at the side of recording and/or reproducing head 42 remote from the location along tape 10 where the latter is grasped by capstan 45 and pinch roller 46 provides a suitable back tension for stabilizing the movement of the tape past head 42. Further, the described contact of guide post 44 with tape run 10a serves to precisely position the tape in respect to head 42.

Since guide post 44 is mounted on chassis 41 of the tape recorder and made a part of the latter, the configuration and positioning of guide post 44 relative to heads 42 and 43, particularly when the latter are operatively positioned as shown on FIG. 7, can be precisely determined. In other words, even though cassette body 3 is molded of a synthetic resin which may be subject to some distortion, such distortion will not influence the critical configuration or positioning of guide post 44 in respect to operatively positioned heads 42 and 43, and thus will not detract from the recording and reproducing characteristics of the tape cassette in use in a tape recorder according to this invention.

If desired, the tape guide post 44 may be movable slightly in the direction of the arrow shown on FIG. 7, for example, from the position shown in broken lines to that shown in full lines, simultaneously with the rearward insertion of heads 42 and 43 into windows 21 and 19. Thus, when cassette body 3 is being loaded into the tape recorder, guide post 44 occupies the position shown in broken lines on FIG. 7 so as to be insertable readily into apertures 23 without the possibility of then engaging and possibly damaging tape run 10a. Thereafter, as heads 42 and 43 are inserted rearwardly into the respective windows 21 and 19 and guide post 44 is displayed forwardly to the position shown in full lines, there is increased certainty that tape run 10a, when engaged by heads 42 and 43 against the respective pads 24, will also be frictionally contacted, midway between such pads, with the surface of guide post 44. When such movement is imparted to guide post 44, the recess 23c at the center of the front edge of each aperture 23 ensures that the forwardly moved post 44 will clear such front edge.

Figure 8:
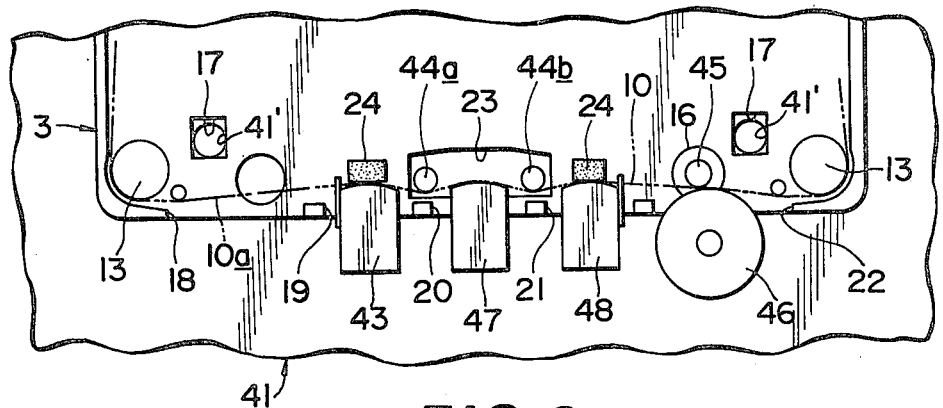
FIGS. 8, 9 and 10 are views similar to that of FIG. 7, but showing cassette-type tape recorders according to other respective embodiments of the invention for use with the tape cassette of FIGS. 1-4.

Referring now to FIG. 8, it will be seen that the tape cassette described above with reference to FIGS. 1-6 may also be used in a three-head cassette-type tape recorder according to an embodiment of this invention, and in which, in place of the recording and reproducing head 42 of FIG. 7, there are provided a recording head 47 and an independent reproducing head 48. In this case, erasing head 43, recording head 47 and reproducing head 48 are suitably mounted on chassis 41 so that, after cassette body 3 is located on the chassis, heads 43, 47 and 48 can be inserted rearwardly through windows 19, 20 and 21, respectively, at the front of the cassette body. Further, in the embodiment of the tape recorder shown on FIG. 8, two tape guide posts 44a and 44b are spaced apart laterally on chassis 41 so that, upon the positioning of cassette body 3 on chassis 41, guide posts 44a and 44b are inserted through apertures 23 adjacent the opposite ends of the latter and in back of tape run 10a adjacent the portions of the latter extending between recording head 47 and erasing head 43 and between recording head 47 and reproducing head 48, respectively.

It will be appreciated that, in the tape recorder shown on FIG. 8, when heads 43, 47 and 48 are inserted rearwardly into respective windows 19, 20 and 21 of cassette body 3 operatively located on chassis 41, erasing head 43 and reproducing head 48 displace tape run 10a rearwardly against the respective pads 24, and recording head 47 similarly deflects tape run 10a against guide posts 44a and 44b which extend forwardly in respect to the rearmost portion of the contact surface of head 47 at the opposite sides of the latter. Thus, tape run 10a is brought into frictional contact with guide posts 44a and 44b to provide the desired back tension on the tape when the latter is driven by capstan 45 and pinch roller 46 grasping the tape therebetween. More particularly, heads 44a and 44b are located at the upstream sides of heads 47 and 48, respectively, considered in respect to the direction of movement of tape run 10a from left to right on FIG. 8 by the cooperative action of capstan 45 and pinch roller 46 so that, in either a recording or a reproducing operation of the tape recorder, the back tension provided by the frictional contact of the tape with guide posts 44a and 44b is effective to stabilize the running of the tape past the operative head 47 or 48.

Here again, since the guide posts 44a and 44b, in the embodiment of FIG. 8, are provided on the chassis 41, the precise dimensioning of such guide posts 44a and 44b and the accurate positioning thereof relative to heads 43, 47 and 48 can be achieved and are not influenced by the possible distortion of the cassette body 3 due to the fact that the latter is molded of a synthetic resin.

Figure 9:
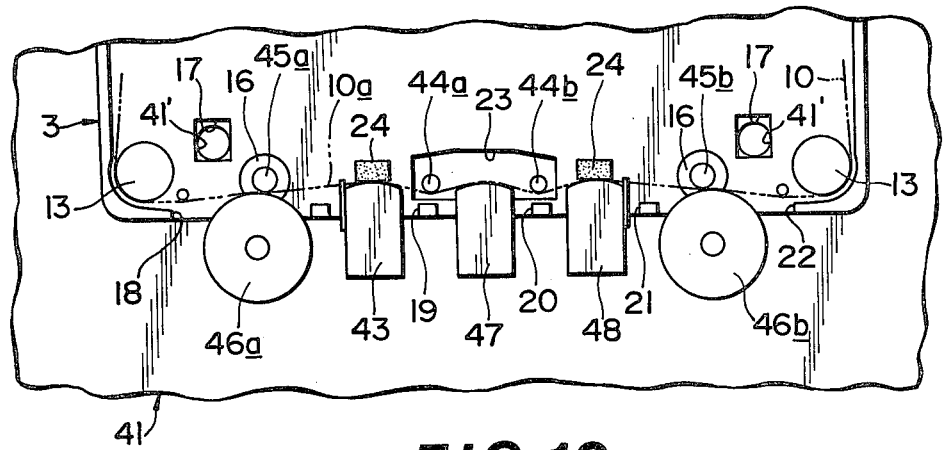

Referring now to FIG. 9, in which the application of the present invention to a tape recorder of the so-called double capstan type is illustrated, it will be seen that such tape recorder has an erasing head 43, recording head 47 and reproducing head 48 and two guide posts 44a and 44b all disposed similarly to the correspondingly numbered parts of the tape recorder described with reference to FIG. 8, and similarly cooperating with the tape run 10a in the cassette body 3 when the latter is positioned or located on chassis 41. However, in place of the single capstan 45 and pinch roller 46 provided in the tape recorders described with reference to FIGS. 7 and 8, respectively, the tape recorder of FIG. 9 has two capstans 45a and 45b located to extend through respective pairs of openings 16 so as to be disposed in back of the portions of tape run 10a which are proximate to windows 18 and 22, respectively. Further, two pinch rollers 46a and 46b are rotatably mounted so as to be insertable rearwardly through windows 18 and 22, respectively, for pressing or clamping respective portions of tape run 10a against capstans 45a and 45b, respectively. Thus, capstans 45a and 45b and the respective pinch rollers 46a and 46b can cooperate to drive tape run 10a at a constant speed.

Once again, when heads 43, 47 and 48 are inserted rearwardly through the respective windows 19, 20 and 21, as shown on FIG. 9, tape run 10a is deflected rearwardly thereby into contact with pads 24, at heads 43 and 48, and also into frictional contact with guide posts 44a and 44b, at opposite sides of recording head 47. As before, such frictional contact of the tape with guide posts 44a and 44b ensures the smooth or stable running of the tape past the heads, and also ensures precise positioning of tape run 10a, particularly in respect to head 47 between guide posts 44a and 44b.

Figure 10:
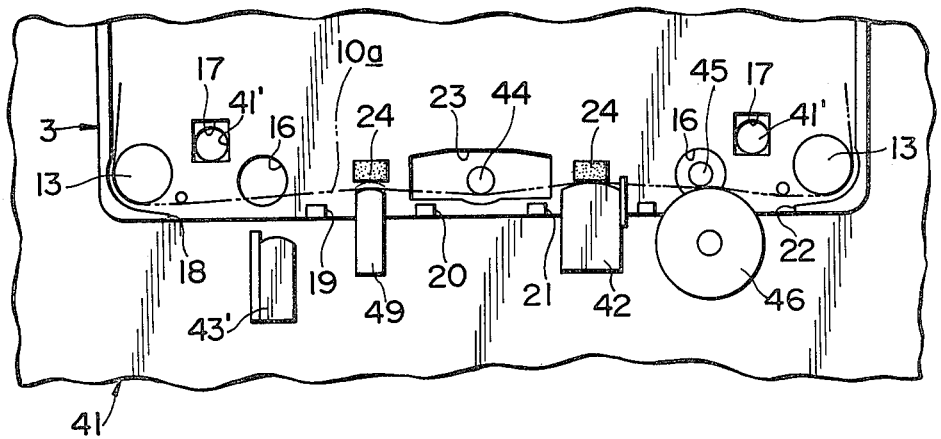

In each of the tape recorders described with reference to FIGS. 7, 8 and 9, respectively, the erasing head 43 has been assumed to be of an electro-magnetic type so that the same can be energized, by a suitable electrical circuit (not shown), only during a recording operation or an erasing operation. Thus, during a reproducing operation, erasing head 43 does not affect signals already recorded on the tape even though head 43 is in contact with the tape during such reproducing operation. However, the present invention can also be applied to a tape recorder of the type in which an erasing head, which may be permanently magnetized, is moved into contact with the tape in the tape cassette only during an erasing or recording operation, and is otherwise spaced from the tape. For example, in the tape recorder illustrated on FIG. 10, a recording and/or reproducing head 42 is insertable rearwardly through window 21 of the located or positioned cassette body 3 on chassis 41, and a tape guide 49 is similarly insertable rearwardly through window 19. When thus inserted, head 42 and tape guide 49 deflect tape run 10a rearwardly against the respective pads 24, and also against a single guide post 44 which, as in the embodiment of FIG. 7, is positioned on chassis 41 so as to be inserted centrally in apertures 23. The tape recorder of FIG. 10 also has a single capstan 45 and a cooperating pinch roller 46 which are operative to grasp therebetween the portion of tape run 10a located in back of window 22. Finally, the tape recorder of FIG. 10 is shown to have an erasing head 43' which is movable in respect to chassis 41 independently of head 42 and tape guide 49, and which is located so as to be adjacent window 18 of the operatively positioned cassette body 3. Thus, in a reproducing operation, as shown on FIG. 10, erasing head 43' can be spaced forwardly substantially from cassette body 3 for avoiding erasing of signals previously recorded on the tape. However, during a recording operation, erasing head 43' can be inserted rearwardly through window 18' for engagement with the portion of tape run 10a therebehind.

In the tape recorder of FIG. 10, as well as in the earlier described tape recorders, upon the loading of the tape cassette in the tape recorder, the guide post 44 provided as part of the tape recorder is inserted into cassette body 3 through the substantially rectangular apertures 23 and, in response to the movement of head 42 and with it tape guide 49 to the operative position thereof, tape run 10a is brought into frictional contact with guide post 44 for providing the requisite back tension to stabilize the running of the tape and also for precisely determining the position of the tape in respect to the recording and/or reproducing head 42.

In all of the described tape recorders according to this invention, since each of the guide posts 44, 44a and 44b is part of the tape recorder, it can be formed and mounted with very high precision, particularly in respect to the magnetic head or heads, so that the magnetic tape can be precisely guided and stabilized relative to the heads by the frictional contact of the tape with the guide post or posts. By reason of the foregoing, the tape cassette according to this invention can be made smaller in size than the existing compact tape cassettes without deleteriously affecting the recording and reproducing characteristics, even if the recorded signal is to cover a very high frequency band, as in the case of a musical tone.

Having described a number of specific embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In a small tape cassette comprising a cassette body including upper and lower halves defining upper and lower substantially rectangular walls and a peripheral wall having portions extending between said rectangular walls at the front, back and opposite sides of the cassette body, a pair of laterally spaced apart reel hubs rotatably mounted within said cassette body and having a magnetic tape wound thereon, and guide elements permanently in said cassette body and leading said tape between the reel hubs in a run extending along the inside of said portion of the peripheral wall at the front of the cassette body;

said portion of the peripheral wall at the front of the cassette body having a plurality of windows spaced apart therealong for exposing said tape in said run therebehind, said upper and lower walls having pairs of aligned openings therethrough at laterally spaced apart locations in back of said run of the tape and registering with respective ones of said windows so that, when the tape cassette is in use in a tape recorder, each of said pairs of openings can receive a capstan against which the tape in said run is engaged by a pinch roller inserted rearwardly through said respective one of the windows, a pair of aligned apertures in said upper and lower walls, respectively, extending back of said run between said pairs of openings and which, in said use in a tape recorder, are adapted to receive tape guide means of the latter engageable with the tape from outside of said cassette body, and pairs of aligned holes in said upper and lower walls adapted, in said use in such tape recorder, to receive positioning pins for locating the cassette relative to the tape guide means.

2. A small tape cassette according to claim 1; wherein said apertures for receiving the tape guide means from outside of said cassette body are elongated in the direction along said run of the tape.

3. A small tape cassette according to claim 2; wherein each of said apertures, at the margin thereof nearest to said run of the tape, has a recess therein.

4. A small tape cassette according to claim 1; in which there are five of said windows in a row with each of said apertures being approximately rectangular so as to be substantially laterally coextensive with the middle one of said five windows.

5. A small tape cassette according to claim 4; in which said respective windows registering with said locations of the pairs of openings are at the opposite ends of said row.

6. A small tape cassette according to claim 5; further comprising pads mounted in said cassette body in back of said run of the tape at locations corresponding to the windows intermediate said middle window and said windows at the opposite ends of the row so that, in said use of the tape cassette, magnetic heads inserted through said intermediate windows can engage said tape run backed-up by said pads.

7. In combination: a small tape cassette comprising a cassette body having upper and lower substantially rectangular walls and a peripheral wall including portions extending between said upper and lower walls at the front, back and opposite sides of the cassette body, laterally spaced reel hubs rotatable within said cassette body and having a magnetic tape wound thereon, and guide elements permanently in said cassette body and leading said tape between the reel hubs in a run extending along the inside of said portion of the peripheral wall at said front of the cassette body, said portion of the peripheral wall at said front of the cassette body having a plurality of windows spaced apart therealong for exposing the tape in said run therebehind, said upper and lower walls having pairs of aligned openings therethrough in back of said run of the tape at laterally spaced apart locations registering with respective ones of said windows, said upper and lower walls having a pair of aligned apertures extending therethrough back of said run between said pairs of openings and substantially coextensive laterally with another of said windows and said upper and lower walls further having spaced apart pairs of aligned positioning holes; and a cassette-type tape recorder including a chassis at least one capstan projecting into a selected one of said pairs of aligned openings of said tape cassette when the latter is positioned on said chassis for use in said tape recorder, at least one pinch roller associated with said at least one capstan and insertable rearwardly in the respective one of said windows for engaging the tape therebehind with said at least one capstan, magnetic head means insertable rearwardly in another one of said windows for recording or reproducing signal information on said tape in said run while said tape is being driven by said at least one capstan and pinch roller, and tape guide means mounted on said chassis independent of said tape cassette and extending into said apertures from outside of said cassette body and engaging said run of the tape adjacent said head means for stabilizing the movement of the tape when being driven past said head means by said at least one capstan and pinch roller, and positioning pins on said chassis extending into said positioning holes for locating said cassette relative to said tape guide means.

8. The combination according to claim 7; in which said tape guide means engages said run of the tape at the side of said head means away from the location on the tape where the latter is engaged with said at least one capstan by said pinch roller.

9. The combination according to claim 8; in which said guide means includes a single guide post substantially centered in said apertures.

10. The combination according to claim 7; in which said guide means includes a pair of guide posts spaced apart laterally in said apertures, and said head means includes a head insertable rearwardly through said window with which said apertures are coextensive for engagement with said run of the tape between said guide posts.

11. The combination according to claim 7; in which said tape guide means is movable in respect to said chassis in a direction toward and away from said run of the tape in the cassette body located by said positioning pins.

12. The combination according to claim 7; in which said tape guide means is initially spaced from said run of the tape in the cassette body located by said positioning pins, and said magnetic head means, when inserted rearwardly in said other one of the windows, engages and deflects said run of the tape into engagement with said tape guide means.

* * * * *